US008448089B2

(12) United States Patent
Li et al.

(10) Patent No.: US 8,448,089 B2
(45) Date of Patent: May 21, 2013

(54) CONTEXT-AWARE USER INPUT PREDICTION

(75) Inventors: Fan Li, Beijing (CN); Qingwei Lin, Beijing (CN); Jiang Li, Beijing (CN)

(73) Assignee: Microsoft Corporation, Redmond, WA (US)

(*) Notice: Subject to any disclaimer, the term of this patent is extended or adjusted under 35 U.S.C. 154(b) by 263 days.

(21) Appl. No.: 12/912,395

(22) Filed: Oct. 26, 2010

(65) Prior Publication Data

US 2012/0102417 A1 Apr. 26, 2012

(51) Int. Cl.
*G06F 3/01* (2006.01)
(52) U.S. Cl.
USPC ............ 715/816; 715/780; 715/762; 715/811
(58) Field of Classification Search
USPC ................................. 715/762, 811, 816, 780
See application file for complete search history.

(56) References Cited

U.S. PATENT DOCUMENTS

| | | | |
|---|---|---|---|
| 6,820,089 B2 * | 11/2004 | Vishnubhotla | 1/1 |
| 7,343,551 B1 | 3/2008 | Bourdev | |
| 7,610,192 B1 * | 10/2009 | Jamieson | 704/9 |
| 7,664,744 B2 * | 2/2010 | Guha | 707/723 |
| 7,739,253 B1 * | 6/2010 | Yanovsky et al. | 707/705 |
| 7,974,980 B2 * | 7/2011 | Matsubara | 707/769 |
| 8,260,938 B2 * | 9/2012 | Gupta et al. | 709/228 |
| 2004/0002849 A1 | 1/2004 | Zhou | |
| 2004/0143564 A1 * | 7/2004 | Gross et al. | 707/1 |
| 2004/0243257 A1 | 12/2004 | Theimer | |
| 2005/0017954 A1 * | 1/2005 | Kay et al. | 345/169 |
| 2006/0206516 A1 * | 9/2006 | Mason | 707/102 |
| 2006/0224995 A1 * | 10/2006 | Treibach-Heck et al. | 715/816 |
| 2006/0247915 A1 | 11/2006 | Bradford et al. | |
| 2006/0253427 A1 | 11/2006 | Wu et al. | |
| 2006/0265648 A1 * | 11/2006 | Rainisto et al. | 715/534 |
| 2007/0250504 A1 | 10/2007 | Chen et al. | |
| 2008/0016457 A1 * | 1/2008 | Tabuchi et al. | 715/773 |
| 2008/0097748 A1 * | 4/2008 | Haley et al. | 704/9 |
| 2009/0077494 A1 * | 3/2009 | Sjolin | 715/810 |
| 2009/0313572 A1 * | 12/2009 | Paek et al. | 715/780 |
| 2010/0005095 A1 * | 1/2010 | Yun et al. | 707/6 |
| 2010/0161538 A1 | 6/2010 | Kennedy, Jr. et al. | |
| 2011/0050575 A1 * | 3/2011 | Krahenbuhl et al. | 345/168 |

OTHER PUBLICATIONS

Koehn, "A Web-Based Interactive Computer Aided Translation Tool", retrieved on Aug. 3, 2010 at <<http://www.aclweb.org/anthology/P/P09/P09-4005.pdf>>, ACL and AFNLP, Proceedings of Software Demonstrations, Suntec, Singapore, Aug. 3, 2009, pp. 17-20.

* cited by examiner

*Primary Examiner* — Daeho Song
(74) *Attorney, Agent, or Firm* — Lee & Hayes, PLLC (57) ABSTRACT

Predicted input data is obtained by initially acquiring a set of operations that are performed on non-editable user interface elements of a user interface prior to a subsequent data input into an editable user interface of the user interface. The set of operations is then classified into a pattern class based on the operations in the set and the subsequent data input that corresponds to the set. Subsequently, a pattern type for the pattern class is generated that describes a relationship between the set of operations and the subsequent data input. Accordingly, when a new set of operations is received, input data is predicted for the new set by applying the pattern type to the new set.

20 Claims, 5 Drawing Sheets

CONTEXT-AWARE USER INPUT PREDICTION

BACKGROUND

Users often input single-line text into an editable user interface element of an application user interface. For example, the editable user interface elements may include an address bar (e.g., in a web browser application), a "file name" field in a "save as" dialog box, and other editable user interface elements that accept single-line text. Over a time period, a user may input text into many different user interface elements of a user interface or input multiple instances of the same data into the same user interface element of the user interface. Such text inputs may become time consuming or repetitive, thereby degrading the computing experience of the user.

SUMMARY

Described herein are techniques that perform context-aware user input prediction to predict data that a user may desire to input into an editable user interface (UI) element of a UI. The UI may be presented by a graphical user interface (GUI) of an operating system. The techniques may predict an upcoming user input to the editable UI element based at least in part on user operations performed on the UI and previous user inputs to the UI. The predicted input data may be presented to the user, and depending on user feedback regarding the predicted input data, the predicted input data or a modified version of the predicted input data may further serve as training data for the refinement of the prediction techniques.

In at least one embodiment, the predicted input data is obtained by acquiring a set of operations that a user performs on non-editable elements of a user interface prior to a subsequent data input into an editable element of the user interface. The acquired operations and the associated subsequent data input are then classified into a pattern class. Subsequently, a pattern type for the pattern class is generated that describes a relationship between the set of operations and the subsequent data input. Accordingly, when a new set of operations is received, corresponding input data is predicted for the new set of operations by applying the pattern type to the new set of operations.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Techniques described herein may perform context-aware data input prediction to predict single-line textual data that may be input into a field of a user interface (UI) that is provided by a computing device. For example, the single-line textual data may be a uniform resource locator (URL) that is entered into an address bar of a web browser, a name of a document that may be entered into a "file name" field of a "save as" dialog box, and so forth. Single-line textual data generally does not include natural language content, such as a paragraph of text, which are inherent in multi-line text data.

The user may express the desire to enter textual data into the UI of the application by performing an action on an editable UI element in the UI. For example, the user may click on an editable UI element implemented as a web browser address bar when the user desires to enter a URL. On the other hand, the user generally interacts with the application via non-editable UI elements of the user interface. For example, a word processing application typically includes non-editable UI elements in the form of a spell check button, a copy button, a paste button, a format button, and so forth.

In the actual program code of an application, the UI elements of the application may be organized in a tree-view hierarchic string structure from a main window to a smallest element (e.g., a button, a lowest level drop-down menu item, etc.). Accordingly, any UI element in the application may be represented using a hierarchic string structure that denotes a path from the main window of the application to the associated UI element. Moreover, all of the actions that are performed over each of the UI elements of the application may be included in a predefined set (e.g., right-click, left-click, drag, and/or the like). As a result, an "operation," as used herein, may denote a combination of a hierarchic string structure of a UI element and a predefined action from the predefined set of actions that is performed on the UI element.

A user's single-line input into an editable UI element may correlate with two types of information: (1) a series of operations that the user performs on one or more non-editable UI elements before the user enters the single-line input; and (2) prior input values that the user entered into the same editable UI element. Collectively, the series of the operations that the user performs on one or more non-editable UI elements immediately prior to a data input to an editable UI element may be referred to herein as a set of operations.

The techniques described herein may be implemented by an input prediction engine. The input prediction engine may predict the data input that the user desires to input into an editable UI element of an application. The input prediction engine may acquire and analyze the series of operations that a user performs on the one or more non-editable UI elements. The prediction engine may then generate predicted input data for an editable UI element prior to the user entering a user input into the editable UI element. The predicted input data may be populated into the editable UI element or otherwise presented to the user via the UI. In some instances, depending on whether the user accepts or modifies the predicted input data, the predict data input or the user modification may further serve as training data for refining the prediction techniques of the input prediction engine.

In various embodiments, the input prediction engine may be integrated into various applications to increase user efficiency during the use of the applications and increase user satisfaction with such applications. Various example implementations of the context-aware data input prediction techniques are described below with reference to FIGS. 1-5.

Illustrative Environment

Figure 1:
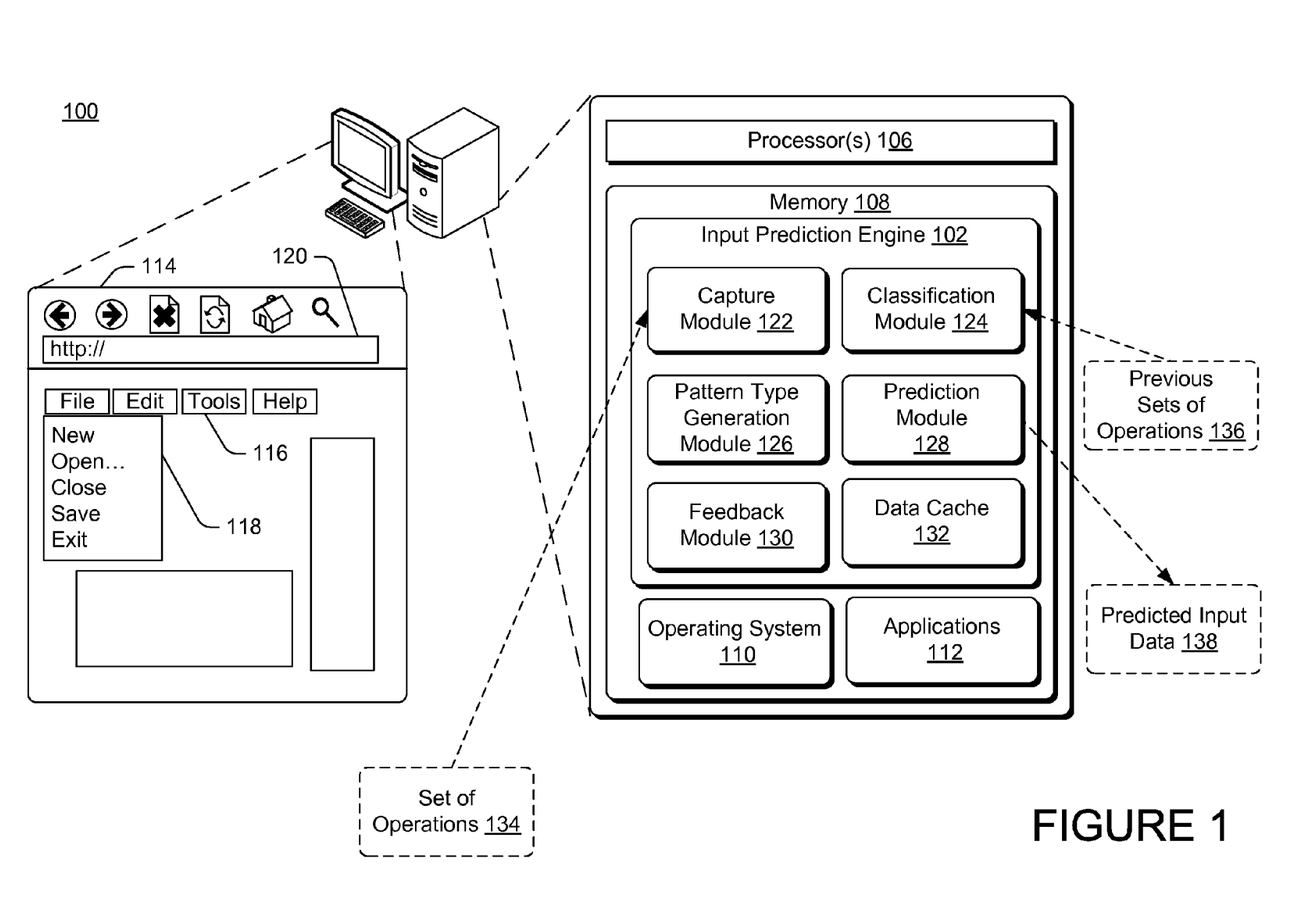
FIG. 1 is a block diagram of an illustrative environment that implements an input prediction engine to predict input data using a context-aware data input prediction techniques.

FIG. 1 is a block diagram of an illustrative environment 100 that implements a context-aware input prediction engine 102 to predict input data. The input prediction engine 102 may be implemented on a computing device 104. The computing device 104 may be a desktop computer, a laptop computer, a server, a personal digital assistant (PDA), a smart phone, a set-top box, an Internet application, a game console, and/or other types of electronic devices that are capable of receiving textual input from a user.

The computing device 104 may include one or more processors 106 and memory 108. The memory 108 may store an operating system 110 and applications 112. The operating system 110 may provide an overall user interface (UI) that includes non-editable UI elements (e.g., buttons, selectable objects, etc.) and editable UI elements (e.g., search input fields, text input fields, etc.).

Further, each of the applications 112 may have non-editable UI elements and editable UI elements. For example, as shown in FIG. 1, one of the applications 112 may be a web browser 114. The web browser 114 may include non-editable elements in the form of menu items that are in a menu bar 116. The activation of a menu item in the menu bar 116 may provide another non-editable element in the form of a drop-down menu list 118. In turn, the drop-down menu list 118 may further include non-editable elements in the form of drop-down list items, and so on and so forth. The web browser application 114 may also include an editable UI element in the form of an address bar 120, in which a user may type in universal resource locators (URLs) or internet protocol (IP) addresses. The applications 112 may also include other programs that run on top of the operating system 110, such as a word processing application, a spread sheet application, an email application, and so forth.

The user may interact with the user interfaces of the applications 112 via the data input devices (e.g., a keyboard, a mouse, etc.) and the data output devices (e.g., a monitor, a printer, etc.) of the computing device 104. The input prediction engine 102 may have access to data regarding operations that are performed on each of the applications 112. In some embodiments, the input prediction engine 102 may be an integral part of at least one of the applications 112.

The memory 108 may also store components of the input prediction engine 102. The components, or modules, may include routines, programs instructions, objects, and/or data structures that perform particular tasks or implement particular abstract data types. The components may include a capture module 122, a classification module 124, a pattern type generation module 126, a prediction module 128, a feedback module 130, and a data cache 132.

In operation, the capture module 122 may acquire a set of operations 134 that are performed on the one or more non-editable UI elements of the UI. The performance of the set of operations 134 may occur prior to an attempt to input data into an editable UI element of the UI. The set of operations 134 may include multiple operations (e.g., five operations, six operations, etc.). Following acquisition by the capture module 122, the set of operations 134 may be classified into a particular pattern class in a group of one or more pattern classes by the classification module 124. The classification may be performed by comparing the set of operations to one or more previous sets of operations 136. Subsequently, the classification module 124 may use the pattern type generation module 126 to generate a pattern type for each of the one or more pattern classes. The prediction module 128 may then apply the pattern type of the particular pattern class to the set of operations to predict an input data 138 for the editable UI element of the UI. The feedback module 130 may then receive user feedback data on the predicted input data 138 and further refine the prediction accuracy of the input prediction engine 102. Thus, with the introduction of this overview, the various functions performed by the components of the input prediction engine 102 are described in detail below.

The capture module 122 may acquire the set of operations 134 that are performed on the UI elements of the UI. As described above, an operation may denote a combination of a hierarchic string structure of a UI element and a predefined action that is performed on the UI element. An example hierarchic string structure is discussed next and illustrated in FIG. 2.

Figure 2:
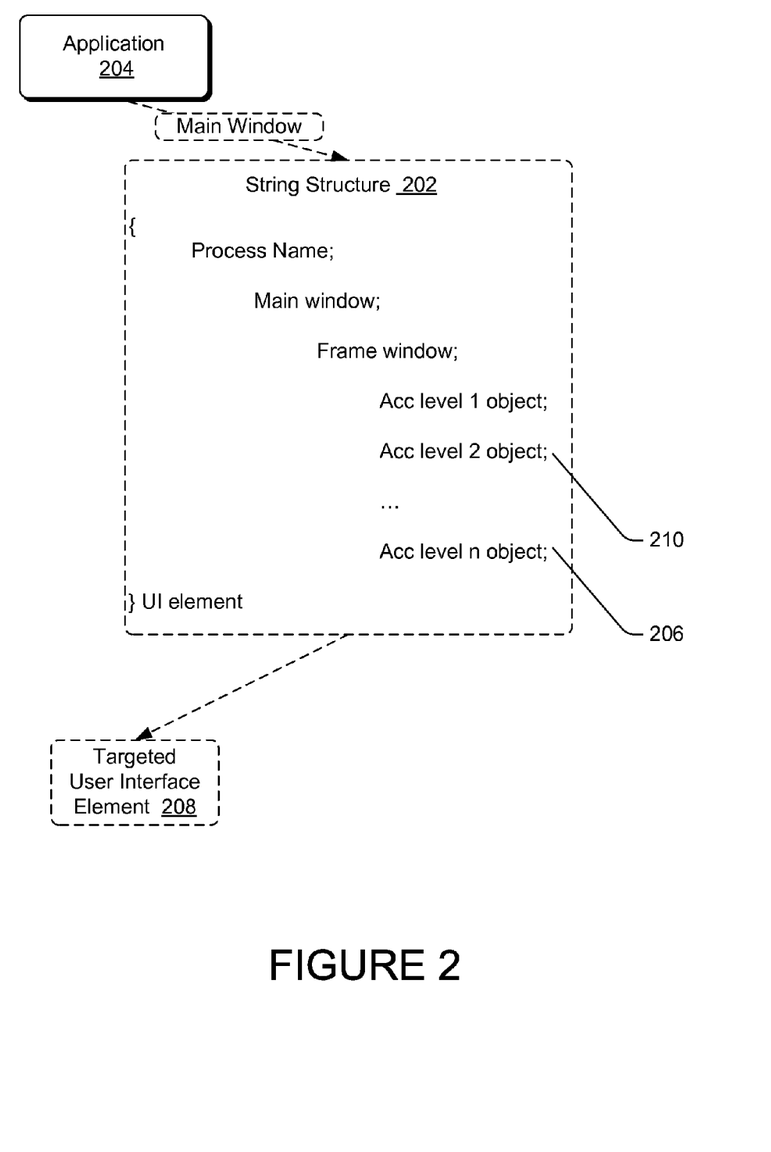
FIG. 2 is a block diagram illustrating an example hierarchic string structure that denotes a path from an application to a particular user interface (UI) element in a UI.

FIG. 2 is a block diagram illustrating an example hierarchic string structure 202 that denotes a path from an application 204 to a particular UI element of the application 204. As shown, the example hierarchic string structure 202 may be composed of a series strings, from the string "Process name" to the string "Acc level n object". In this structure, each "Acc level object" denotes a standard description of a UI element that is supported by most applications, such as the applications 112. As a whole, the strings in the hierarchical structure 202 may denote the hierarchic organization of UI elements for the application 204. In various embodiments, each of the Acc level objects may contain a plurality of properties, such as a "name" property, a "type" property, and/or the like. As shown in FIG. 2, the Acc level object on the lowest level, which is an object 206, may denote a targeted UI element 208 that is part of an operation. Each of the Acc level objects on the correspondingly higher levels may denote a parent of the targeted UI element 208, the parent of the parent, and so forth. For example, as shown, an Acc level object 210 may be the parent of the targeted UI element 208, also known as the Acc level object 206. In this way, the hierarchical structure 202 may denote a path from a main window of the application 204 to the targeted UI element 208.

Returning to FIG. 1, the capture module 122 may acquire the set of operations 134 that relate to both non-editable UI elements, as well editable UI elements of the UI. With respect to the editable UI elements, the capture module 122 may further acquire the values that are inputted into the editable UI elements as part of the performed operations. In turn, the capture module 122 may cache the acquired data in the data cache 132.

In various embodiments, when the capture module 122 senses that a data input into an editable element is about to be performed by a user, the capture module 122 may feed a predetermined number of immediately preceding operations, such as the set of operations 134, to the classification module 124 for analysis. For example, the capture module 122 may expect an input of data into the editable UI element when a user clicks on the address bar of a web browser.

The classification module 124 may receive sets from the capture module 122. As described above, each set of operations is a series of operations 134 that are preformed on one or more non-editable UI elements of a UI, prior to a data input to an editable UI element of the UI. Since the classification module 124 is receiving the sets from the capture module 122, the capture module 122 may set the number of operations 134 in each set that is received by the classification module 124 (e.g., five operations, six operations, etc.).

The classification module 124 may use an enhanced Weighted Edit Distance (WED) method to classify the sets of operations received from the capture module 122 into one or more existing pattern classes. In various embodiments, the classification module 124 may compare a new set that it receives, such as the set of operations 134, with one or more previously encountered sets of operations 136, and classify the new set of operations into an existing pattern class of one of the sets of operations 136 that has a minimum edit distance to the new set. However, if no existing pattern class is available, e.g., when the classification module 124 is used for the first time, the classification module 124 may create a new pattern class for the new set of operations 134.

In at least one implementation, assuming there are two sets of operations, X and Y, in which both of these sets operations include a predetermined number of operation steps, such as N=5 operations steps, and in which $X=(A_1, A_2, \ldots, A_N)$, $Y=(B_1, B_2, \ldots, B_N)$, then the function performed by the classification module 124 may be illustrated in the context of X and Y.

Initially, the classification module 124 may use a biggest weighted common sequence method to determine an alignment between the X and Y sets of operations. In the implementation of this method, the classification module 124 may use the operation type of the operations in the sets (e.g., right-click, left-click, drag, etc.) to make an alignment between the two sets.

For example, given that X=(A, B, A, C, A), Y=(B, A, A, B, A), where A, B, and C denote different user operation types respectively, and the match weight are a1=0.1; a2=0.2; a3=0.3; a4=0.4; a5=0.5, then the biggest weighted common subsequence may be ABA, and the biggest weighted sum may be 0.5+0.4+0.3=1.2, In at least one embodiments, the classification module 124 may use the following algorithm to derive this sum (assuming that the W[i][j] denote the biggest weighted sum between $X[1, \ldots, i]$ and $Y[1, \ldots, j]$):

| | |
|---|---|
| if | X[i] = Y [j], then W[i][j] = W[i−1][j−1] + $a_{max\{i,j\}}$ |
| else if | X[i] ≠Y [j], then W[i][j] = max { W[i−1][j], W[i][j−1]} |
| initially, | W[i][0] = W[0][j] = 0 |

Subsequently, the classification module 124 may attempt to obtain a predetermined number of candidate weighted common subsequences in terms of the weighted sum, and sum up the edit distance between the corresponding operations in the X and Y sets to derive the edit distance between the X and Y sets. For example, if the common a candidate weighted common subsequence is ABA, then the similarity, that is, the edit distance (ED) between the X and Y sets may be derived as:

$$ED(X[5], Y[5])+ED(X[2], Y[4])+ED(X[1], Y[3]).$$

In other words, the ED between the X and Y sets may be derived from the corresponding operations in the X and Y sets. Thus, in order to calculate the ED between any two sets, the classification module 124 may also have the ability to calculate the edit distance between any two arbitrary operations, such as each pair of corresponding operations in the X and Y sets.

Each operation may be represented by a hierarchic structure, such as the hierarchic structure described in FIG. 2, and each level in a particular hierarchic structure may be expressed as a string. This is because, as stated above, an operation may include a combination of (1) a hierarchic string structure of a UI element and (2) a predefined action that is performed on the UI element. Thus, by leveraging such characteristics, the classification module 124 may use an edit distance to measure similarity between any two arbitrary operations. More specifically, in order to obtain the edit distance between two operations, the classification module 124 may actually calculate the edit distance between the two UI elements that are operated on by the two operations, as two operations with different operation types may be deemed as completely different and unrelated to each other.

In order to calculate the edit distance between two UI elements, the classification module 124 may initially calculate the edit distances of the corresponding strings in those UI elements. Subsequently, the classification module 124 may sum up the edit distances of the corresponding strings to derive the edit stance between the two UI elements. In turn, the edit distance between the two UI elements represents the edit distance of the two corresponding operations.

Thus, as described above, the classification module 124 may derive an edit distance between any two sets of operations by calculating the edit distances of corresponding operations in the two sets, and summing such edit distances to obtain an overall edit distance. Further, as described above, the classification module 124 may compare a new set of operations that it encounters with one or more previously encountered sets, and classify the new set of operations into an existing pattern class of a particular previously encountered set of operations that has a minimum edit distance to the new set of operations.

In some scenarios, it may be possible that the new set of operations may be classified into multiple pattern classes. For example, such a scenario may occur if the user has previously performed two sets of operations that are identical, but ultimately inputted two different values into the same editable UI element of an application, such as one of the applications 112. In such scenarios, the interaction of the classification module 124 with the pattern type generation module 126 and the prediction module 128, as described below, may ultimately produce two different predicted input data values.

The classification module 124 may leverage the pattern type generation module 126 to generate a pattern type for each pattern class. A pattern type may describe the relationship between the input values to the editable UI elements that correspond to sets of operations in a pattern class on the one hand, and related context information on the other hand. The related context information may include: (1) the operations in the sets that have been classified into the particular pattern class; and (2) the input values that have been previously inputted into the editable UI elements associated with those sets of operations. In other words, the pattern type of a pattern class is a unique signature that identifies the pattern class, and no pattern class may share a pattern type with another pattern class.

The pattern type of each pattern class may be represented by a unique regular expression. Thus, the pattern type generation module 126 may perform pattern analysis on the sets of operations and associated input values in each pattern class to find a suitable regular expression to illustrate the relationship between inputs values and corresponding context information in the class. In various embodiments, the pattern type generation module 126 may initially define a set of parameters for the operations within the pattern class that are contributors to the corresponding user inputs. The parameters may be based on strings in the hierarchic structures of the UI elements corresponding to operations that are different in different sets of operations. For example, if a user is clicking on a particular file object (e.g., test.doc), the control type of a UI element may be "file object", and the control value of the UI element may be "test.doc". Thus, the parameter may be the control value "test.doc" if the user did not clicked the particular file object in other sets of operations.

Subsequently, the pattern type generation module 126 may define a plurality of rules, such as linear combination rules, as potential regular expression representations of the set of parameters. The pattern type generation module 126 may then find the most fitting regular expression from the set of regular expressions based on sets of operations and input values in the pattern class using one or more predefined rules. In at least one embodiment, the one or more predefined rules may describe a relationship among multiple data inputs to the same editable UI element. For example, the predefined rules may stipulate that the input values to a particular editable UI element are identical. In another example, the predefined rules may stipulate that the input values to the particular editable UI element following a particular trend, such as "XYZ1", "XYZ2", and "XYZ3". In this way, the pattern type generation module 126 may derive a regular expression that represents each pattern class.

The prediction module 128 may derive predicted input data 138 for a new set of operations by applying a particular pattern type to the new set to calculate the predicted input data 138. The prediction module 128 may calculate the predicted input data 138 when the capture module 122 senses that the user is about to enter a data input into an editable UI element of an application, such as one of the applications 112. Accordingly, when the new set of operations immediately preceding the imminent data input is classified into an existing pattern class, the prediction module 128 may then apply the particular pattern type of the existing pattern to the new set to obtain the predicted input data 138. In turn, as further described below, the predicted input data 138 that is calculated by the prediction module 128 may be provided to the user as the possible data input that the user is about to entered into the editable UI element.

The prediction module 128 may calculate predicted input data 138 by applying a regular expression that represents a pattern type of an existing pattern class to defined parameters in the new set of operations. In various embodiments, the pattern type generation module 126 may defined the parameters for the new set of operations in the same manner as parameters are defined for a pattern class as described above. For example, given that three parameters are defined for the new set, $X_1$, $X_2$, and $X_3$, the classification module 124 may classify the new set of operations into an existing pattern class that has the regular expression "input value=$X_2+X_3$". In such an example, the classification module 124 may calculate the predicted input data 138 by following this regular expression, and set "$X_2+X_3$" as the value of the predicted input data 138. It will be appreciated that in scenarios in which the new set of operations is classified into multiple existing pattern classes, the predicted input data 138 may include multiple predicted input values.

The feedback module 130 may present the predicted input data 138 to a user. In some embodiments, the feedback module 130 may automatically populate the predicted input data 138 to an editable UI element to which the user is about to enter data. In other embodiments in which the predicted input data 138 includes multiple predicted input values, the feedback module 130 may provide a drop down menu in relation to the editable UI element so that the user may select the desired predicted input data.

The feedback module 130 may further store data into the data cache 132 to refine the prediction ability of the input prediction engine 102. In various embodiments, if the user accepts predicted input data 138 for the new set of operations that is presented, the feedback module 130 may add the predicted input data and the new set of operations into the corresponding pattern class as a training example. Alternatively, if the user edits or rewrites the predicted value in the predicted input data 138 into a corrected input value that is identical to a value derived with the application of another existing pattern type to the new set of operations, the feedback module 130 may add the predicted input data with the corrected input value and the new set of operations into the class that corresponds to the other existing pattern type as a training example. However, if the user edits or rewrites the predicted value in the predicted input data 138 into a corrected input value that cannot be derived with the application of any existing pattern type to the new set of operations, then the feedback module 130 may cause the classification module 124 to create a new pattern class for the new set of operations and the predicted input data with the corrected input value.

Accordingly, since all training data in the form of operations may be acquired online by the input prediction engine 102, the engine may not employ offline training data to learn operation input patterns. Instead, the input prediction engine 102 relies on incremental learning via the feedback module 130.

The data cache 132 may store the metadata related to the acquired operations, generated pattern classes, generated pattern types, values of the predicted input data, as well as corrected input values of the predicted input data. The data cache 132 may also store any additional data used by the input prediction engine 102, such as various additional intermediate data produced during the derivation of the predicted input data 138.

The context-aware data input prediction techniques performed by the various modules of the input prediction engine 102 may be described as follows (assuming L sets of operations belong to M pattern types already exist):

1. for each new set of operations X, compute the nearest edit distance between X and each previous set of operations to generate a vector $e=(e_1, e_2 \ldots e_m)$, where $e_i=\min\{ED(X, \text{set} \in \text{pattern type i})\}$.
2. find minimum $e_j$ from e, and assign pattern type $P_j$ to X.
3. calculate the input value following pattern type $P_j$, then,
4. if the user accepts the input value, add $(X, P_j)$ as a new training example.
5. if the user edits or rewrites the input value as z, then compare z with the results generated by following other pattern types, which are described as $y(P_i)$:
   i. if there exists a pattern type $P_k$ that makes $y(P_k)=z$, then add the new set $(X, P_k)$ as a new training data example;
   ii. otherwise, establish a new pattern type $P_n$, and add the new set $(X, P_n)$ as the only set of the new pattern type Pn.

Accordingly, as time goes by, the input prediction engine 102 may accumulate an increasing number of sets of operations and pattern classes, and the accuracy of the input value predictions by the input prediction engine 102 may be continuously improved. Moreover, it will be appreciated that a result of the design of the input prediction engine 102 is that any two sets of operations may be successfully classified into the same pattern class only when (1) the two sets of operations are initially classified into the same pattern class based on edit distance; and (2) the relationships between the input value and corresponding parameters of the operations in each set may be described using the same regular expression.

Example Processes

Figure 3:
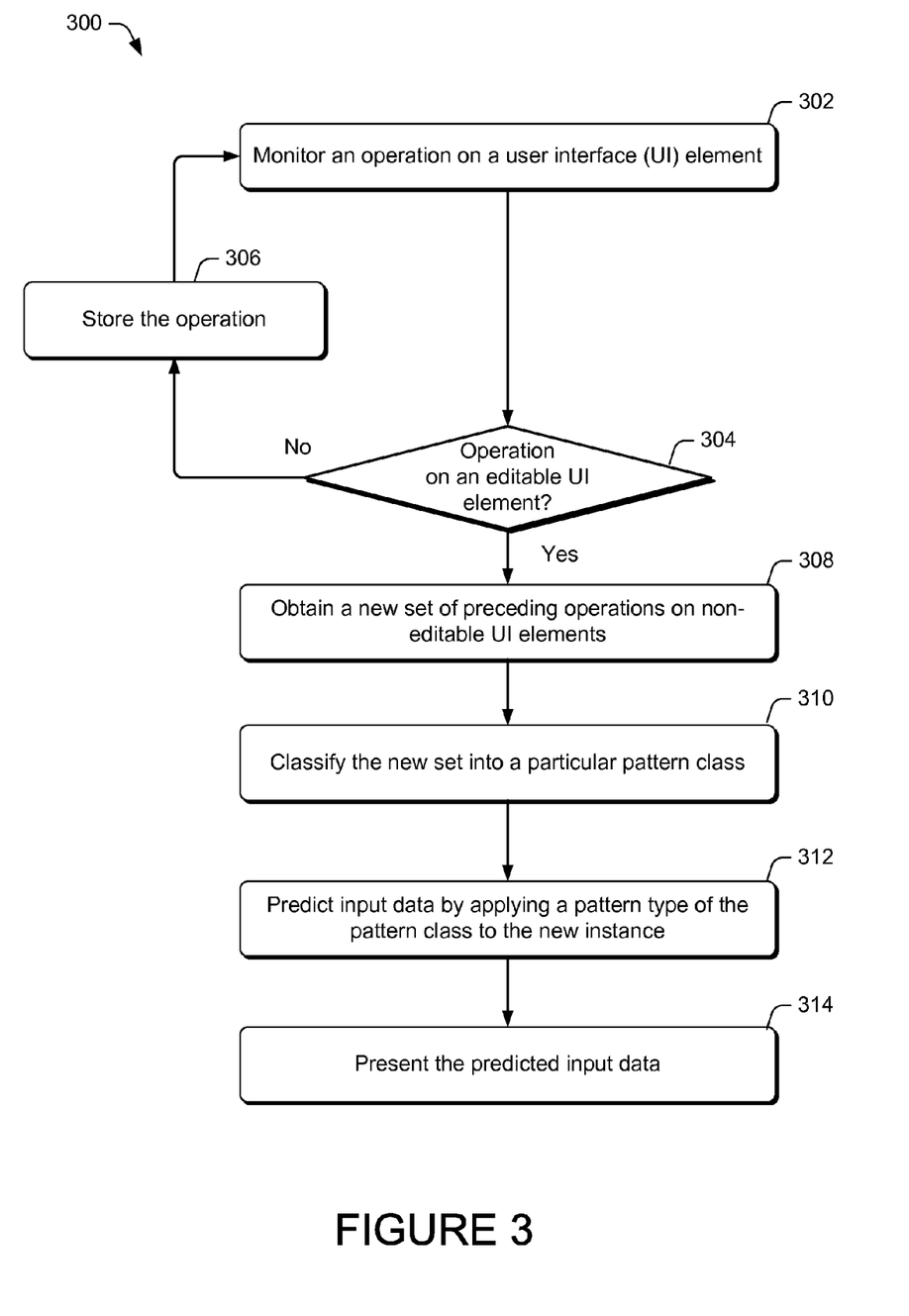
FIG. 3 is a flow diagram of an illustrative process to predict input data based on the operations performed on non-editable user interface elements of a UI.
Figure 4:
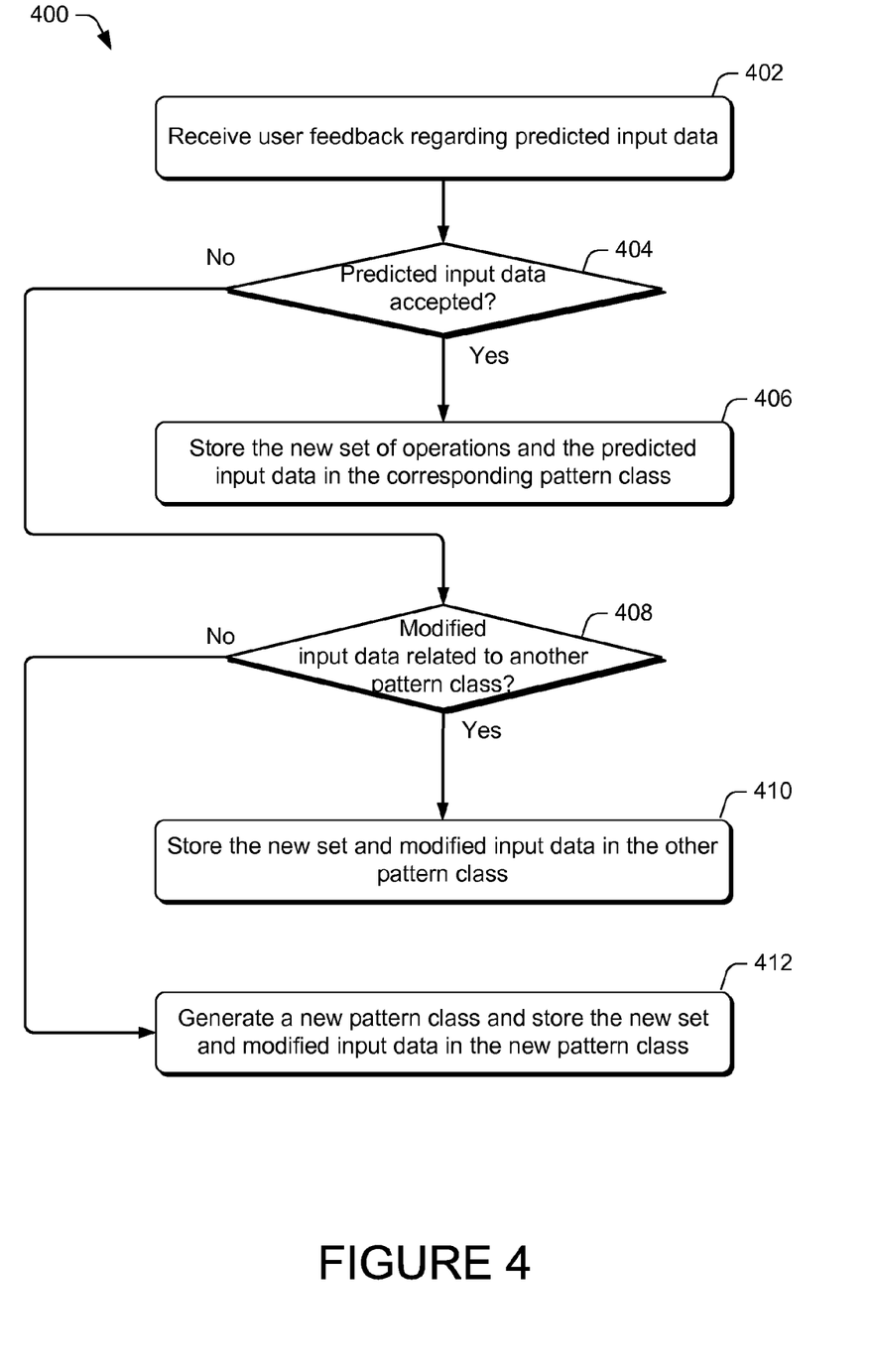
FIG. 4 is a flow diagram of an illustrative process to train the input prediction engine based on user feedback regarding the predicted input data.

FIGS. 3 and 4 describe various example processes for implementing the context-aware user input prediction techniques. The example processes are described in the context of the environment of FIG. 1, but is not limited to that environment. The order in which the operations are described in each example process is not intended to be construed as a limitation, and any number of the described blocks can be combined in any order and/or in parallel to implement each process. Moreover, the blocks in each of the FIGS. 3 and 4 may be operations that can be implemented in hardware, software, and a combination thereof. In the context of software, the blocks represent computer-executable instructions that, when executed by one or more processors, cause one or more processors to perform the recited operations. Generally, the computer-executable instructions may include routines, programs, objects, components, data structures, and the like that cause the particular functions to be performed or particular abstract data types to be implemented.

FIG. 3 is a flow diagram of an illustrative process 300 to predict input data based on the operations performed on non-editable user interface elements of an application user interface using the input prediction engine 102. At block 302, the capture module 122 of the input prediction engine 102 may monitor an operation that is performed on a user interface (UI) element of a UI. The UI may be provided by the operating system 110 and/or one of the applications 112. At decision block 304, the capture module 122 may determine whether the acquired operation is an operation on an editable UI interface element of the UI. If the capture module 122 determines that the acquired operation is performed on a non-editable UI element ("no" at decision block 304), the process 300 may proceed to block 306.

At block 306, the capture module 122 may store the operation into the data cache 132. Subsequently, the process 300 may loop back to block 302 so that the capture module 122 may capture another operation.

However, if at decision block 304 the capture module 122 determines that the acquired operation is an operation on an editable UI element ("yes" at decision block 304), the process 300 may proceed to block 308. For example, a user may have clicked on the editable UI element in preparation for entry of data into the editable UI element.

At block 308, the classification module 124 may obtain a new set of operations, that is, a plurality of immediately preceding operations that were performed on the non-editable UI elements. The new set of operations may include a predetermined number of operations (e.g., four operations, seven operations, etc.). For example, the new set may be the set of operations 134. In various embodiments, the capture module 122 may provide the data on the new set of operations to the classification module 124 from the data cache 132.

At block 310, the classification module 124 may classify the new set of operations into a pattern class. In various embodiments, the classification module 124 may use an enhanced Weighted Edit Distance (WED) method to classify the new set of operations into a particular pattern class that includes a corresponding existing set of operations 128. The particular pattern class may be selected based on the fact that the corresponding existing set of operations 128 has the greatest similarity, that is, the shortest edit distance to the new set of operations. The particular pattern class may also have a corresponding pattern type that is generated by the pattern type generation module 126. The pattern type may be expressed as a regular expression that is based on the defined parameters of the corresponding existing set of operations 128.

At block 312, the prediction module 128 may apply the corresponding pattern type of the particular pattern class to the new set of operations to obtain predicted input data 138. In various embodiments, the prediction module 128 may calculate the predicted input data, such as the predicted input data 138, by applying the regular expression that represents the pattern type to defined parameters in the new set of operations.

At block 314, the feedback module 130 may present the predicted input data 138 to the user. In various embodiments, the feedback module 130 may populate the editable UI element with the predicted input data 138.

FIG. 4 is a flow diagram of an illustrative process 400 to train the input prediction engine 102 based on user feedback regarding the predicted input data. At block 402, the feedback module 130 may receive user feedback regarding predicted input data 138. In various embodiments, the user feedback may include user acceptance or user modification of the predicted input data 138. For example, the user may click a "save button" when the predicted input data 138 is a correctly predicted file name for a new data file that is to be save. Alternatively, the user may modify the predicted file name prior to clicking the "save button".

At decision block 404, the feedback module 130 may ascertain whether the user has determined that a value in the predicted input data 138 is acceptable. If the feedback module 130 determines that the predicted input data is accepted ("yes" at decision block 404), the process 400 may proceed to block 406. At block 406, the feedback module 130 may add the predicted input data 138 and a set of operations on which the predicted input data 138 is generated into a corresponding pattern class as new training data. In various embodiments, the predicted input data 138 may be generated from the set of operations via the process 300 described in FIG. 3.

However, if the feedback module 130 determines that the predicted input data is not accepted ("no" at decision block 404), the process 400 may proceed to decision block 408. In various embodiments, the feedback module 130 may determine that the predicted input data 138 is not accepted when the user edits or rewrites the value of the predicted input data 138 into a corrected input value.

At decision block 408, the feedback module 130 may determine whether a modified input data that includes the corrected input value is related to another pattern class. In various embodiments, the modified input data is related to another existing set of operations when the corrected input value is capable of being derived with the use of an existing pattern type of the other pattern class on the new set of operations. Thus, if the feedback module 130 determines that the modified input data is related to another set of operations ("yes" at decision block 408), the process 400 may proceed to block 410.

At block 410, the feedback module 130 may add the modified input data that includes the corrected input value and the new set of operations into the other existing pattern class. However, if the feedback module 130 determines that the modified input data is not related to another existing set of operations ("no" at decision block 408), the process 400 may proceed to block 412.

At block 412, the feedback module 130 may cause the classification module 124 to create a new pattern class for the new set of operations and the modified input data that includes the corrected input value. The pattern type generation module 126 may also generate a corresponding type for the new pattern class based on the operations in the new set of operations and the modified input data.

Example Computing Device

Figure 5:
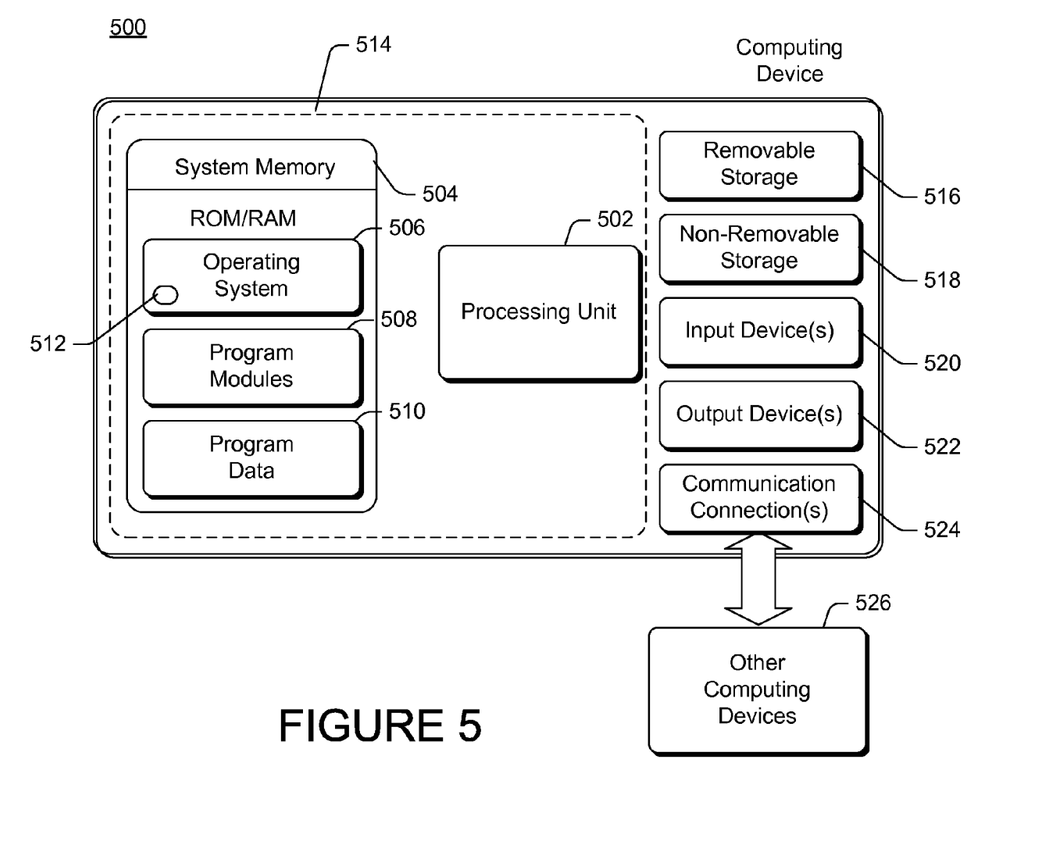
FIG. 5 is a block diagram of an illustrative computing device that implements the input prediction engine.

FIG. 5 illustrates a representative computing device 500 that may be used to implement an input prediction engine 102 that predicts input values for an editable UI element of an application. However, it is understood that the techniques and mechanisms described herein may be implemented in other computing devices, systems, and environments. The computing device 500 shown in FIG. 5 is only one example of a computing device and is not intended to suggest any limitation as to the scope of use or functionality of the computer and network architectures. Neither should the computing device 500 be interpreted as having any dependency or requirement relating to any one or combination of components illustrated in the example computing device.

In at least one configuration, computing device 500 typically includes at least one processing unit 502 and system memory 504. Depending on the exact configuration and type of computing device, system memory 504 may be volatile (such as RAM), non-volatile (such as ROM, flash memory, etc.) or some combination thereof. System memory 504 may include an operating system 506, one or more program modules 508, and may include program data 510. The operating system 506 includes a component-based framework 512 that supports components (including properties and events), objects, inheritance, polymorphism, reflection, and provides an object-oriented component-based application programming interface (API). The computing device 500 is of a very basic configuration demarcated by a dashed line 514. Again, a terminal may have fewer components but may interact with a computing device that may have such a basic configuration.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by removable storage 516 and non-removable storage 518. Computer storage media may include volatile and nonvolatile, removable and non-removable media implemented in any method or technology for storage of information, such as computer readable instructions, data structures, program modules, or other data. System memory 504, removable storage 516 and non-removable storage 518 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by Computing device 500. Any such computer storage media may be part of device 500. Computing device 500 may also have input device(s) 520 such as keyboard, mouse, pen, voice input device, touch input device, etc. Output device(s) 522 such as a display, speakers, printer, etc. may also be included.

Computing device 500 may also contain communication connections 524 that allow the device to communicate with other computing devices 526, such as over a network. These networks may include wired networks as well as wireless networks. Communication connections 524 are some examples of communication media. Communication media may typically be embodied by computer readable instructions, data structures, program modules, etc.

It is appreciated that the illustrated computing device 500 is only one example of a suitable device and is not intended to suggest any limitation as to the scope of use or functionality of the various embodiments described. Other well-known computing devices, systems, environments and/or configurations that may be suitable for use with the embodiments include, but are not limited to, personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

The use of the input prediction engine to predict input data during the use of various applications may improve user efficiency and increase user satisfaction with the user interfaces of the applications.

Conclusion

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:

1. A computer readable device storing computer-executable instructions that, when executed, cause one or more processors to perform operations comprising:

acquiring sets of operations that are performed on a user interface (UI), each set includes operations that are performed on one or more non-editable UI elements of the UI prior to a subsequent data input into one of a plurality of editable UI elements of the UI;

classifying the sets of operations into one or more pattern classes based on the operations performed in each set and the subsequent data input in each set, each pattern class having a different pattern type;

receiving a new set of operations that includes operations that are performed on one or more non-editable UI elements;

assigning the new set of operations into one pattern class of the pattern classes based at least in part on the operations of the new set that are performed on the one or more non-editable UI elements;

generating predicted input data for the new set of operations by applying a pattern type of the one pattern class to the new set of operations; and populating the predicted input data into an editable UI element.

2. The computer readable device of claim 1, further comprising instructions that, when executed, cause the one or more processors to perform an act of generating a pattern type for each pattern class by:

defining a set of parameters for the operations in a pattern class that are contributors to one or more subsequent data inputs of at least one set of operations;

defining a plurality of linear combination rules as potential regular expressions of the set of parameters; and finding a most fitting regular expression of the potential regular expressions based on one or more set of operations and one or more corresponding subsequent data inputs using a predefined rule that describes a trend relationship among multiple subsequent data inputs to a single editable UI element.

3. The computer readable device of claim 1, further comprising instructions that, when executed, cause the one or more processors to perform acts comprising:

receiving feedback regarding the predicted input data;

storing the new set of operations as training data for the one pattern class when the feedback indicates that the predicted input data is correct;

storing the new set of operations as training data for an additional pattern class when the feedback provides a first corrected input value in place of the predicted input data that is related to the additional pattern class; and classifying the new set of operations into a new pattern class when the feedback provides a second corrected input value in place of the predicted input data that is unrelated to any of the one or more pattern classes, the first corrected input value is related to the additional pattern class when applying a pattern type of the additional pattern class to the new set yields the corrected input value.

4. The computer readable device of claim 1, wherein each of the non-editable and editable UI elements is represented by a hierarchic string structure that denotes a path from a main window of an application to the respective UI element, and wherein each operation includes a combination of the hierarchic string structure and a predefined action that is performed on the corresponding non-editable UI element.

5. The computer readable device of claim 1, wherein the classifying includes classifying two sets of operations into a single pattern class at least when (1) an edit distance between the two sets is smaller than an edit distances between each of the two sets and other sets of operations, and (2) a common regular expression describes the pattern types of the two sets.

6. The computer readable device of claim 1, wherein the classifying includes classifying the new set of operations into one of the pattern classes by:
   computing an edit distance between the new set of operations and each classified set of operations; and
   selecting at least one pattern class that includes a set of operations with a smallest edit distance to the new set of operations.

7. The computer readable device of claim 6, wherein the computing includes computing the edit distance between the new set of operations and a set of classified operations by summing the edit distances of a biggest weighted common sequence of operations that are performed by the new set of operations and the set of classified operations.

8. The computer readable device of claim 7, wherein the edit distance between a pair of operations in the biggest weighted common sequence of operations is calculated by:
   computing edit distances of hierarchic string structures corresponding to a pair of non-editable UI elements operated on by a first operation in the new set of operations and an identical second operation in the classified set of operations; and
   summing the edit distances of the hierarchic string structures to obtain the edit distance between the first operation and the identical second operation.

9. A computer-implemented method, comprising:
   acquiring a first set of operations performed on one or more non-editable user interface (UI) elements of a UI prior to a subsequent data input into an editable UI element of an application;
   classifying the first set of operations into a pattern class based on the operations performed in the first set and the subsequent data input following the first set;
   generating a pattern type for the pattern class that describes a relationship between the set of operations in the first set of operations and a value of the subsequent data input;
   receiving a second set of operations that are performed on one or more non-editable UI elements of the UI; and
   calculating predicted input data for the second set of operations by applying the pattern type to the second set.

10. The computer-implemented method of claim 9, further comprising:
   sensing an imminent data input into the editable element of the application prior to the receiving; and
   providing the predicted input data for display in an editable UI element of the application.

11. The computer-implemented method of claim 9, further comprising assigning the second set of operations to the pattern class when an edit distance between the second set of operations and the first set of operations is lower than an edit distance between the second set of operations and an additional set of operations that is classified into another pattern class.

12. The computer-implemented method of claim 11, wherein the edit distance between the second set of operations and the first set of operations is computed from edit distances of a biggest weighted common sequence of operations that are performed by the first set of operations and the second set of operations.

13. The computer-implemented method of claim 12, wherein an edit distance between a pair of operations in the biggest weighted common sequence of operations is calculated by:
   computing edit distances of hierarchic string structures corresponding a pair of non-editable UI elements operated on by a first operation in the first set of operations and an identical second operation in the second set of operations; and
   summing the edit distances of the hierarchic string structures to obtain the edit distance between the first operation and the identical second operation.

14. The computer-implemented computer implemented method of claim 9, further comprising storing the second set of operations as training data for the pattern class when a feedback indicates that the predicted input data is correct.

15. The computer-implemented method of claim 14, further comprising:
   storing the second set of operations as training data for an additional pattern class when the feedback provides a first corrected input value in place of a value in the predicted input data that is related to the additional pattern class; and
   classifying the second set of operations into a new pattern class when the feedback provides a second corrected input value in place of the value of predicted input data that is unrelated to the additional pattern class, the first corrected input value is related to the additional pattern class when applying a pattern type of the additional pattern class to the second set of operations yields the corrected input value.

16. A system, comprising:
   one or more processors; and
   a memory that includes components that are executable by the one or more processors, the components comprising:
      a capture component to acquire sets of operations that are performed on a user interface (UI), each set includes operations that are performed on one or more non-editable UI elements of the UI and input values that are input into the UI prior to a subsequent data input into one of a plurality of editable UI elements of the UI;
      a classification component to assign the sets of operations into one or more pattern classes based on the operations performed in each set of operations and an pattern type of each set of operations;
      a pattern type generation component to generate a pattern type for each set of operations that describes a relationship between the operations in the set of operations and the subsequent data input; and
      a prediction component to calculate predicted input data for a new set of operations by applying a pattern type of a particular pattern class to the new set of operations.

17. The system of claim 16, further comprising a feedback component to provide the predicted input data for display in an editable UI element of an application.

18. The system of claim 16, further comprising a feedback component to:
- store the new set of operations as training data for the particular pattern class when a feedback indicates that the predicted input data is correct;
- store the new set of operations as training data for an additional pattern class when the feedback provides a first corrected input value in place of a value in the predicted input data that is related to the additional pattern class; and
- classify the new set of operations into a new pattern class when the feedback provides a second corrected input value in place of the value in the predicted input data that is unrelated to the additional pattern class, the first corrected input value is related to the additional pattern class when applying a pattern type of the additional pattern class to the new set yields the corrected input value.

19. The system of claim 16, wherein the classification component is to determine that the new set of operations belongs to the particular pattern class when an edit distance between the new set of operations and an additional set of operations in the particular pattern class is smaller than an edit distance between the new set of operations and another set of operations that is classified into another pattern class.

20. The system of claim 16, wherein the classification component is to calculate the edit distance between the new set of operations and the additional set of operations by summing the edit distances of a biggest weighted common sequence of operations that are performed by the new set of operations and the additional set of operations.

* * * * *